United States Patent [19]

Itoh

[11] Patent Number: 4,687,321

[45] Date of Patent: Aug. 18, 1987

[54] MARK DETECTION APPARATUS FOR A MICRO-ROLL FILM

[75] Inventor: Masaaki Itoh, Zama, Japan

[73] Assignee: Minolta Camera Kabushiki Kaisha, Osaka, Japan

[21] Appl. No.: 790,367

[22] Filed: Oct. 23, 1985

[30] Foreign Application Priority Data

Oct. 23, 1984 [JP] Japan .................. 59-223774

[51] Int. Cl.$^4$ .............................. G06K 7/10
[52] U.S. Cl. .................... 355/41; 250/570; 355/77; 353/26 A
[58] Field of Search .............. 355/41, 77; 250/557, 250/570, 559–561; 353/26 A; 226/33

[56] References Cited

U.S. PATENT DOCUMENTS

| | | | |
|---|---|---|---|
| 3,904,099 | 9/1975 | Inoue | 226/33 |
| 4,176,944 | 12/1979 | Payrhammer | 355/41 X |
| 4,514,641 | 4/1985 | Tanaka et al. | 250/557 X |
| 4,600,841 | 7/1986 | Tokuno et al. | 250/557 X |
| 4,607,950 | 8/1986 | Ishii et al. | 355/41 |

*Primary Examiner*—L. T. Hix
*Assistant Examiner*—D. Rutledge
*Attorney, Agent, or Firm*—Burns, Doane, Swecker & Mathis

[57] ABSTRACT

Disclosed is a mark detection apparatus for a microfilm having marks which are recorded adjacent to respective frames and are classified into a few groups with different sizes. The apparatus detects widths of the marks, determines a threshold level from detected widths of the marks and controls counting of the marks by size through the use of the threshold level.

3 Claims, 6 Drawing Figures

MARK DETECTION APPARATUS FOR A MICRO-ROLL FILM

BACKGROUND OF THE INVENTION

This invention relates to a mark detection apparatus for a micro-roll film, and particularly to a mark detection apparatus which can be used for a micro-roll film having marks of different sizes.

A microreader and a reader-printer are the apparatus which projects an image of a microfilm on a screen or a photosensitive member. When a roll-like microfilm is used, the apparatus may be used in combination with a retrieval device. The retrieval device effects retrieval by counting marks (which are called blip marks) placed adjacent to each frame of the microfilm.

In one method of placing blip marks, a plurality of blip marks having different sizes are used on a single roll of film (hereinafter called "multi-blip system"). FIG. 1 shows a film 1 having blip marks L, M and S of sizes, large, middle and small. These blip marks L, M and S are placed in such a manner that the contents of the frames 2 contained in the film are classified into large, middle and small classes, in that a large-size mark L is placed on the head frame of a series of frames defined by the large class, a middle-size mark M on the head frame of a series of frames defined by the middle class, and a small-size mark S on the remaining frames. Then, for example, numbers (p, q, and r) are assigned to the marks (L, M, and S). The p-number mark L is first retrieved, the q-number mark M is then retrieved and finally the r-number mark S is retrieved thereby finding out a frame corresponding to the numbers (p, q and r).

The conventional device for classifying and detecting the blip marks of different sizes has a plurality of mark detection elements d1 ... d4 arrayed in a predetermined spaced relation corresponding to the sizes of marks, as shown in FIG. 2. The on and off states of the detection elements are used to discriminate the mark sizes. However, this conventional device has a drawback of increasing cost since the device requires many detection elements. This device has a further significant drawback in that as the spacing between the detection elements is set in accordance with a certain rule, marks in accordance with a different rule cannot be detected. This results from the circumstances that there exists no unified standards for the sizes of blip marks, and blip marks available from the world have a variety of sizes.

Among the multi-blip systems, there is a film which uses marks of two sizes. However, if an attempt is made to retrieve this film by the aforementioned three-size detection apparatus, it has been difficult for the apparatus to discriminate, which one of three combinations, of blip sizes, large and middle, large and small, and middle and small, is used.

The present applicant has proposed an arrangement wherein a single detection element and a pulse train proportional to the travel of a film are used to discriminate blip marks having a plurality of sizes, as disclosed in U.S. patent application, Ser. No. 726,874, filed Apr. 25, 1985. According to this proposal, the number of pulses generated during the detection of marks by the detection element are counted, and the counted value is compared with a predetermined reference value to discriminate the sizes. In this proposal, the number of detection elements may be reduced but the reference value has to be predetermined. Thus, it was not possible to discriminate blip marks having plural sizes different from the aforesaid reference value.

SUMMARY OF THE INVENTION

It is therefore a main object of the present invention to provide a mark detection apparatus which can discriminate the sizes of blip marks prepared in accordance with any rules.

It is a further object of the present invention to provide a mark detection apparatus which creates for itself a reference value for discimination of sizes during the retrieval.

The aforementioned objects may be achieved by a mark detection apparatus which comprises an element for detecting marks on a roll film, means for producing a pulse train proportional to the travel of the roll film, means for counting the number of pulses produced during the time the mark detection element detects the marks to obtain a mark width, means for arithmetically calculating a threshold for discriminating both sizes using the numbers of pulses corresponding to the marks of different sizes, a first and a second counter, counter control means for discriminating the sizes of the marks by the calculated threshold for counting the numbers of marks in the first and second counters and for counting the number of marks detected until the threshold is set, in either counters, and means for setting the counter to their proper values after the threshold has been set.

More specifically, the aforesaid threshold is set as a mean value of the number of pulses indicating two mark widths of different sizes.

Furthermore, more specifically, the means for setting the counters to their proper values is controlled so that the first and second counters are preset in order according to the size, and if the pre set size is different from the size of mark to be stored in the counter after the threshold has been calculated, the value of the counter is shifted to the counter of the proper size. Alternatively, the setting means is carried out by the control of an index indicating which size the counter having the counted value corresponds to, after the threshold has been set.

BRIEF DESCRIPTION OF THE DRAWINGS

These and other objects or features of the present invention will become apparent from the following description of a preferred embodiment thereof in conjunction with the accompanying drawings, in which.

In the following description, like parts are designated by like reference numbers throughout the several drawings.

DETAILED DESCRIPTION OF THE PREFERRED EMBODIMENT

A preferred embodiment of a roll film retrieval device which uses a mark detection apparatus in accordance with the present invention will be described hereinafter with reference to FIGS. 3 through 6.

Figure 1:
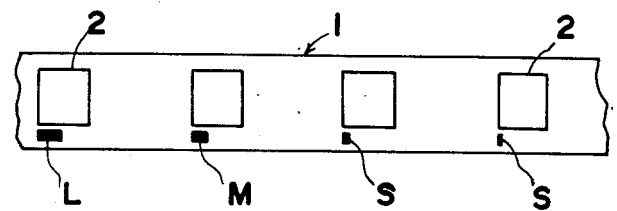
FIG. 1 shows a micro-roll film having blip marks of different sizes.
Figure 2:
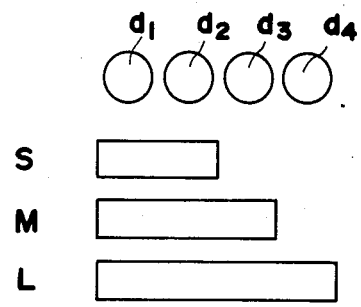
FIG. 2 illustrates a conventional method which uses a plurality of detection elements for detecting blip marks of different sizes.
Figure 3:
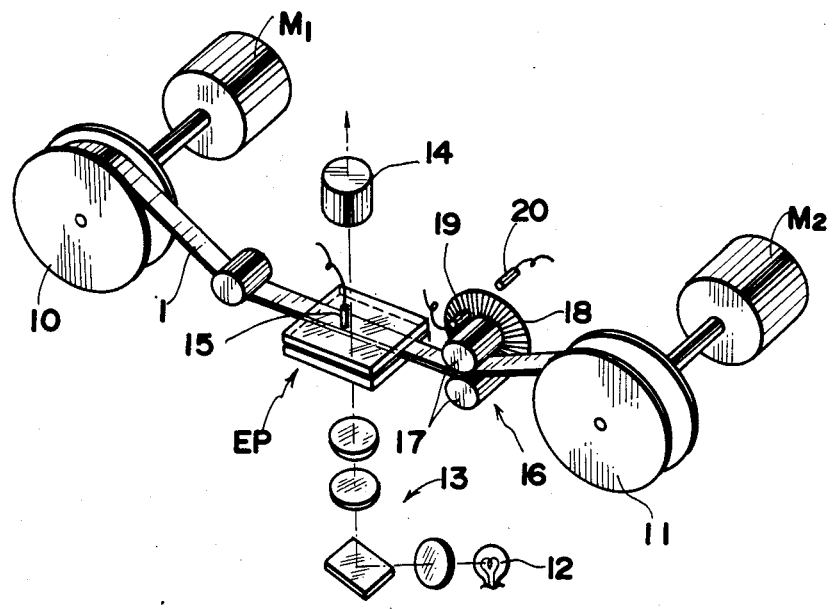
FIG. 3 shows a roll film retrieval apparatus which embodies the present invention.

Referring now to FIG. 3, a roll film 1 is extended over a winding reel 11 passing through an illuminating position EP from a supply reel 10. The supply reel 10 and the winding reel 11 are driven by motors M1 and M2, respectively. At the illuminating position EP, the roll film 1 is positioned between two glass plates and is illuminated by a lamp 12 and a condenser optical system 13. An image of the microfilm formed by said illumination is projected on a screen or a photosensitive member not shown by means of a projection lens 14. A mark detection element 15 is provided at the illuminating position to detect a blip mark placed on the film 1, and a mechanism 16 which provides a pulse signal proportional to the travel of the film is provided on the travelling path of the film 1. This mechanism 16 comprises a pair of idle rollers 17, 17 following the travel of the film, an encoder plate 18 mounted on one roller 17, and a light emitting element 19 and a light receiving element 20 opposedly arranged with the encoder plate 18 sandwiched therebetween. When the film 1 travels, the paired rollers 17, 17 are rotated accordingly, and a transparent portion and an opaque portion of the encoder plate 18 alternately pass through between the light emitting element 19 and the light receiving element 20 whereby said pulse signal is released from the light receiving element.

Figure 4:
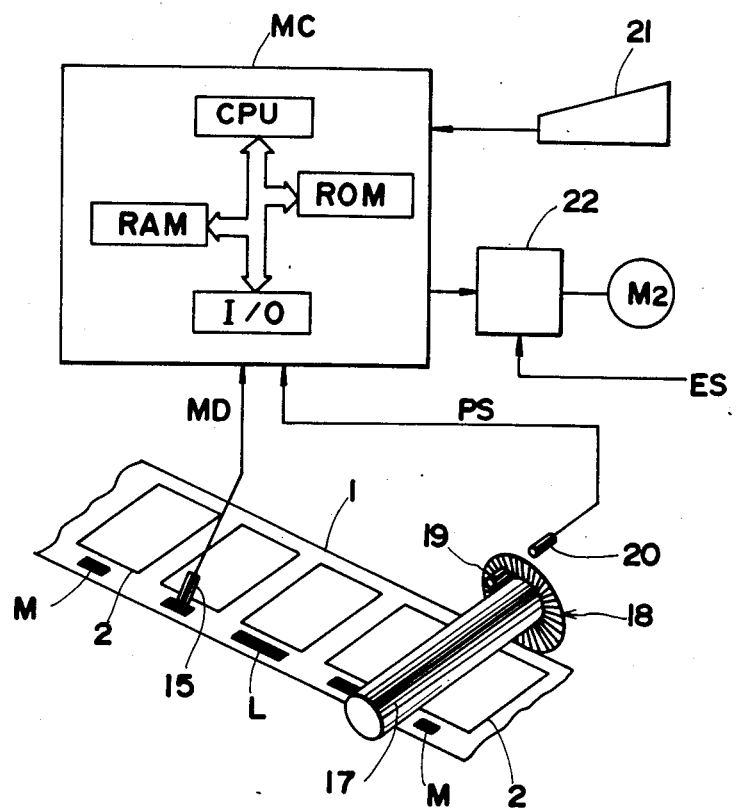
FIG. 4 is a schematic view of a control mechanism in accordance with the present invention.

A mark detection signal MD from the mark detection element 15 and a pulse signal PS from the light receiving element 20 are put into the control mechanism shown in FIG. 4. The control mechanism is composed of a microcomputer MC, which includes a central processing unit CPU, a read only memory ROM, a random access memory RAM and an input/output port I/O. The microcomputer MC receives a command input from a keyboard 21 to release a drive signal to a drive circuit 22 of the winding motor M2 A signal ES from a film end detector not shown is put into the drive circuit 22, and when the film is wound to its end, the motor M2 is forcibly stopped. It is to be noted that the microcomputer MC also releases signals to the motor M1 and other devices, which are not shown in FIG. 4.

Figure 5:
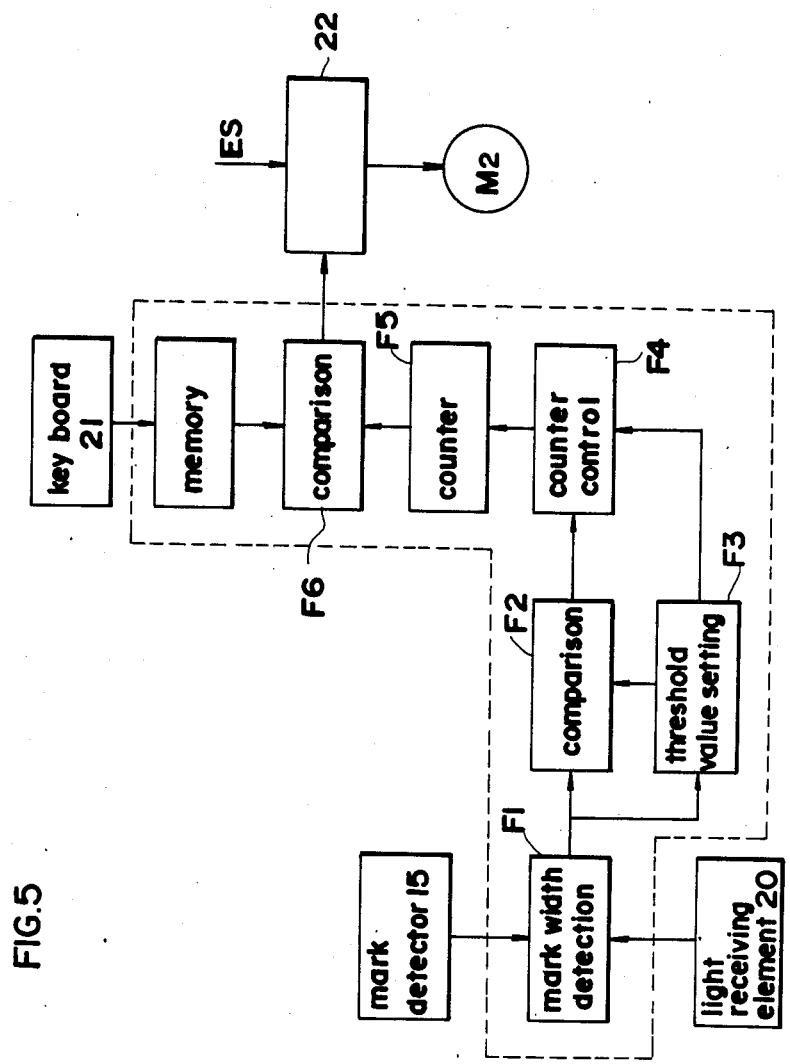
FIG. 5 conceptually collectively shows the function of a microcomputer shown in FIG. 4.

FIG. 5 is a view which conceptually illustrates the function of the microcomputer MC and also shows the relationship with external devices. The function of the microcomputer MC is indicated by the portion surrounded by the broken lines. In FIG. 5, F1 shows the function which receives signals from the mark detection element 15 and the light receiving element 20 to detect the width of blip marks. Here, the number of pulse signals produced during the time the mark detection element 15 detects a certain mark is counted. F2 shows the function which compares the mark width from the function F1 with a threshold from the function F3 described later to discriminate the size of the mark. In the function F3, a comparison is made between the previous and present mark widths (which are expressed by the pulse number), and when the mark widths are different from each other, their average is calculated, which is set as a threshold. Judgement whether the mark widths are different is made by an allowable error, for example, by the presence of a difference in size above 0.5 mm. This function F3 cannot obtain a meaning count command from the function F2 until the threshold is set, therefore, a provisional count command is put out to the succeeding functon F4.

The function F4 performs the control of selectively feeding commands in a manner such that a provisional count command from the function F3 is fed to the succeeding function F5 until the threshold has been set whilst a count command from the function F2 is fed thereto after the threshold has been set.

The function F5 is provided with a first counter for counting a larger mark L and a second counter for counting a smaller mark S. This embodiment shows a retrieval device for a microfilm having marks of two sizes. However, the sizes of the marks can be of a combination of a large mark L and a middle mark M, a combination of a large mark L and a small mark S, and a combination of a middle mark M and a small mark S.

These first and second counters may be in the form of a digital counter to be set in a predetermined area of RAM. After the threshold has been set, count commands are released from the function F4 discriminating the larger mark L from the smaller mark S, and therefore, in the case of the larger mark L, counting is made by the first counter whereas in the case of the smaller mark S, counting is made by the second counter. However, before the threshold is set, which mark size has been detected is unkown, and therefore, the function F3 provisionally releases a count command as the smaller mark S. WHen a mark of size different from that of the initially detected mark is detected, both are compared in size, and if the initially detected mark is the smaller mark S, the value of the second counter is kept as it is. Conversely, when the initially detected mark size, based on the comparison is the larger mark L, a command for shifting the counted value of the second counter for the smaller mark S to the first counter for the larger mark L is released. Thereby, the counted value in the function F5 is properly corrected and a proper counted value is set in the counter corresponding thereto. In this manner, values obtained by counting successively detected marks by sizes are stored in the first and second counters. These counted values and values received from the keyboard and stored in a memory are compared in the function F6, and when they are in coincidence, a stop command signal is released to the film feed control circuit 22 to stop the motor M2. The film end detection signal ES causes the motor M2 to stop when the end of the roll film is detected irrespective of the presence of the signal from the function F6.

Figure 6:
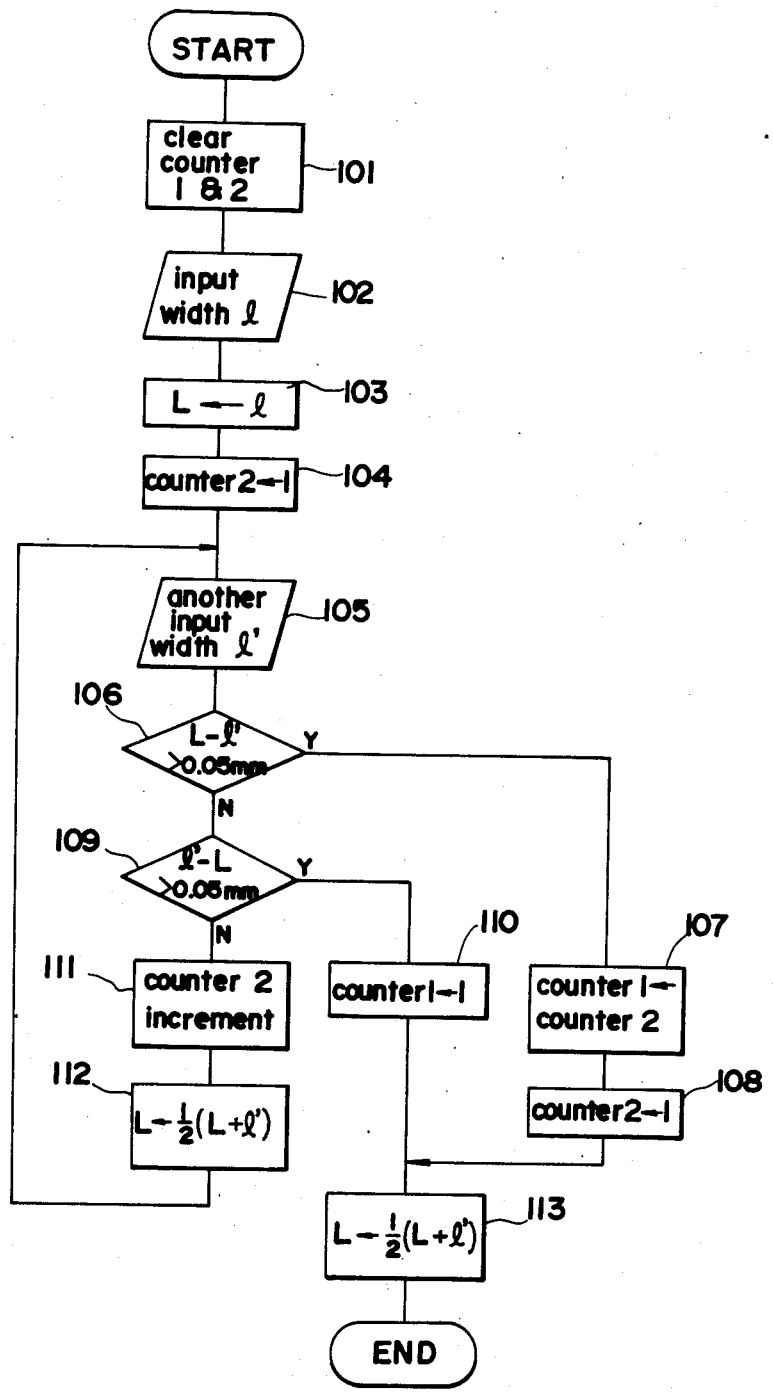
FIG. 6 is a flow chart of the function F3 shown in FIG. 5.

Next, a program in accordance with which the microcomputer MC executes to determine the threshold, that is, the function F3 in FIG. 5, will be described with reference to FIG. 6. Other controls will not be described since they are basically similar to those of prior art.

When control is started, in Step 101, the first counter and the second counter are cleared. In Step 102, the first blip mark width l is calculated from a detected blip mark, and in Step 103, a register L is updated by the detected blip mark width l. In this state, since the threshold is not yet set, in Step 104 "1" is put into the second counter for the smaller mark S. In the next Step 105, the next blip mark is received to calculate its blip mark width l'. This blip mark width l' is compared with the previous blip mark width L in Step 106, and when their difference (L-l') is larger than a predetermined value (0.5 mm) as the range of an allowable error, such difference is interpreted to be a meaning difference between the blip mark widths. The program is shifted Step to Step 107 where the value in the second counter is switched to the first counter. In Step 108, the just counted value ("1") is shifted to the second counter.

In Step 106, if the difference L-l') is smaller than the allowable error, the next program step is Step 109 wherein the difference between the second and first mark widths (l'-L) is determined. When a meaningful difference above the range of allowable error is present, "1" is set to the first counter in Step 110.

When in Step 109, the difference is judged to be within the range of allowable error, the second counter is subjected to increment in Step 111. In Step 112, the mean value of the blip mark widths is calculated, and the resultant means value is set in the register L as a provisional judged reference value L, returning to Step 105 for judgement of a next blip mark width.

On the other hand, when in Steps 106 and 109, a meaningful difference between both the blip mark widths is judged to be present, the program is shifted to Step 113 via Step 108 or Step 110. In Step 113, a threshold L as a judged reference value for later blip mark widths is obtained by calculating the mean value $((\frac{1}{2})(L+l'))$ between the previous blip mark width L and the present blip mark width l', after which this threshold is used as a reference to judge the magnitude of the blip mark width.

For brevity, the embodiment above-described was for use with two blip sizes. It will be understood by those with ordinary skill in the art that, within the spirit of the present invention, blip mark widths can be successively measured and repeatedly compared to set two thresholds to discriminate three sizes of marks.

In the above-described embodiment, the first and second counters are predesignated to the larger mark and smaller mark, respectively, and the counted value was corrected after the threshold had been set. Alternatively, flags can be used to indicate which counted values in the respective counters correspond to which size of mark after the threshold has been set, and when retrieval takes place, a counted value of what size of mark is contained in what counter is judged by said flags to effect retrieval control.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mark detection apparatus for a microfilm having marks which are placed adjacent to respective frames and are classified into a few groups with different sizes, the apparatus comprising:
   a mark detecting element for detecting the marks,
   means for generating pulses in proportion to running of the microfilm,
   means for identifying the number of pulses generated during the detection of individual marks,
   means for establishing a threshold value from two numbers of pulses respectively corresponding to marks with different sizes.
   a first counter for counting the number of detected marks with certain size,
   a second counter for counting the number of detected marks with another size,
   means for loading the number of marks of the first-detected size into either the first or the second counter before establishing the threshold value, and
   means for setting the counters to particular values in which each of the counters is designated for the size of a mark after the threshold value is established.

2. A mark detection apparatus as claimed in claim 1, wherein said loading means loads the number of marks of the first-detected size into the first counter which is designated for the smaller mark size, and said setting means shifts the count value of the first counter to the second counter if the first-detected mark is subsequently determined to have been of the larger size.

3. A mark detection apparatus as claimed in claim 1, wherein said establishing means calculates the average of two numbers of pulses and uses the average as the threshold value.

* * * * *